United States Patent [19]

Ammann

[11] Patent Number: 4,751,782
[45] Date of Patent: Jun. 21, 1988

[54] LASER BEAM LEVELLING INSTRUMENTS

[76] Inventor: Hans-Rudolf Ammann, Breitenach, 8580 Amriswil, Switzerland

[21] Appl. No.: 940,406

[22] Filed: Dec. 11, 1986

[30] Foreign Application Priority Data

Jan. 18, 1986 [CH] Switzerland .............. 185/86

[51] Int. Cl.[4] .................. G01C 5/02; G01B 11/26
[52] U.S. Cl. .................. 33/291; 33/DIG. 8; 33/DIG. 21; 318/648; 356/399
[58] Field of Search .................. 33/291, 299, DIG. 8, 33/DIG. 21; 318/648; 356/249, 250, 399

[56] References Cited

U.S. PATENT DOCUMENTS

| 3,462,845 | 8/1969 | Matthews | 33/291 |
| 3,471,234 | 10/1969 | Studebaker | 33/DIG. 21 |
| 3,588,249 | 6/1971 | Studebaker | 33/DIG. 21 |
| 3,936,197 | 2/1976 | Aldrink et al. | 356/399 |
| 4,031,629 | 6/1977 | Paluck | 33/299 |
| 4,035,084 | 7/1977 | Ramsay | 33/291 |
| 4,247,809 | 1/1981 | Nessel | 318/648 |
| 4,265,027 | 5/1981 | Burniski | 33/291 |

Primary Examiner—Richard R. Stearns
Attorney, Agent, or Firm—Harold Gell

[57] ABSTRACT

A laser beam levelling instrument has a pipe length which is vertically and centrally mounted in the cover of a casing. The ends of this pipe length are pivotable, so that it can always be held in the vertical position. For this purpose two spirit levels are arranged at right angles to one another on a plate fixed to the lower end of the pipe length. The fluid in these levels is electrically conducting and the levels have electric contact points for operating a respective electric motor. The electric motors are provided with eccentric shafts which come into contact with the circumferential surface of the pipe length. If the pipe length diverges from the vertical, then the current from batteries ensures that it is brought back into the vertical position by means of the eccentric shafts. A laser light source is located in the lower part of the pipe length and a further pipe length is inserted in the upper end of the pipe length and can be rotated by a third electric motor. The further pipe length carries a head with a window. The laser beam enters the head vertically, is diverted there into the horizontal and passes out of the window as a horizontal laser beam.

8 Claims, 2 Drawing Sheets

LASER BEAM LEVELLING INSTRUMENTS

FIELD OF THE INVENTION

This invention relates to a laser beam levelling instrument with means for producing a laser beam and with rotary reflection means with which the vertically incoming laser beam can be deflected into the horizontal and is pivotable in a horizontal plane.

BACKGROUND OF THE INVENTION

Laser beam levelling instruments of the aforementioned type are used for fixing a horizontal plane and are in particular used for building purposes. The laser beam passing out of the instrument in a generally invisible manner is caused to rotate horizontally by a rotary head. The rotary laser beam can then be received by a receiver at a random point around the levelling instrument and rendered visible. With the aid of a stadia rod adjustably fitted to the receiver it is then possible to carry out many different measuring and control functions. Laser beam levelling instruments are used, for example, in excavating soil and levelling foundation trenches, in checking concrete foundations and floors, in aligning forms, when levelling tracks for high superstructure cranes, when applying height markings and for many other purposes.

Prior to the start of the work, a laser beam levelling instrument must itself be horizontal on a frame or support and for this purpose spirit levels are often positioned externally on the instrument. To obviate a time-consuming fine setting on each occasion, it is advantageous if the actual instrument has an automatic levelling function in a maximum broad range. Automatic levelling of the instrument is also very advantageous because the instrument can easily be brought out of a horizontal position on a building site due to vibrations or shocks during surveying work. However, the results would be falsified by an unnoticed lateral tilt of the instrument.

In hitherto known instruments, automatic levelling has generally been achieved by a gimbal mount, so that these instruments are very large and cumbersome, particularly if servomotors are also used for assisting the automatic levelling. Attempts have also been made to suspend the rotary head with reflection means on wires. Admittedly, this reduces the size of the instrument but the actual automatic levelling can only take place in a very small range.

SUMMARY OF THE INVENTION

The object of the invention is to provide a portable laser beam levelling instrument, which has a small size and low weight, which can be automatically levelled within a broad movement range and which can also be inexpensively manufactured.

Accordingly, the invention provides a laser beam levelling instrument having means for producing a vertical laser beam and rotary reflection means for deflecting said vertical laser beam into a horizontal beam, at least said beam deflecting means being mounted on a pipe length which is suspended vertically in a bearing about which it is pivotable in a horizontal plane, means being provided for maintaining said pipe length in a vertical position, said means being arranged to close at least one electric circuit when the pipe length diverges from the vertical position and by means of which at least one electric motor is operative to restore the pipe length to said vertical position.

According to one embodiment of the invention, the electric circuit closing means comprise two spirit levels located on said pipe length at right angles to one another, each said spirit level being filled with an electrically conducting fluid and being provided with electric contact points which close said at least one electric circuit when the pipe length diverges from said vertical position.

BRIEF DESCRIPTION OF THE DRAWINGS

The invention will now be further described, by way of example, with reference to the drawings, in which.

DETAILED DESCRIPTION OF PREFERRED EMBODIMENT

Figure 1:
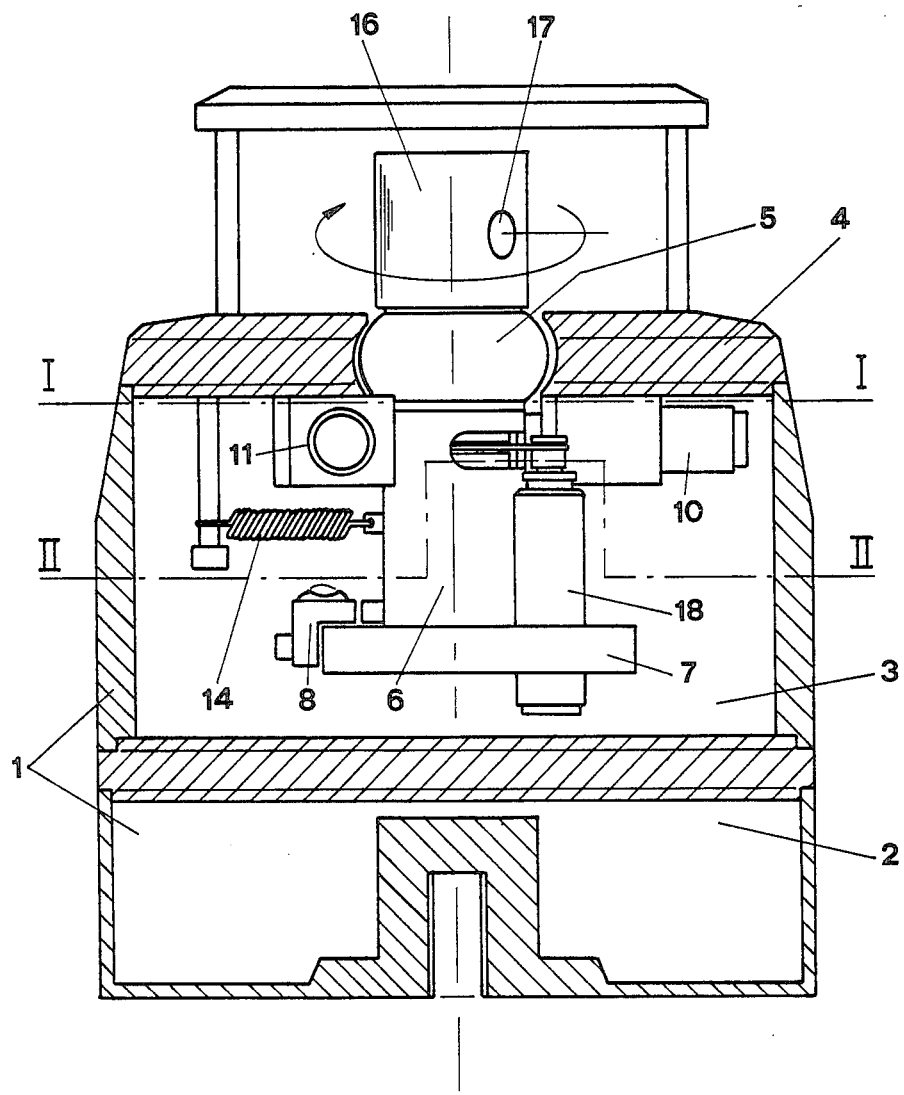
FIG. 1 is a vertical longitudinal cross-section thru one embodiment of a laser beam levelling instrument according to the invention.
Figure 2:
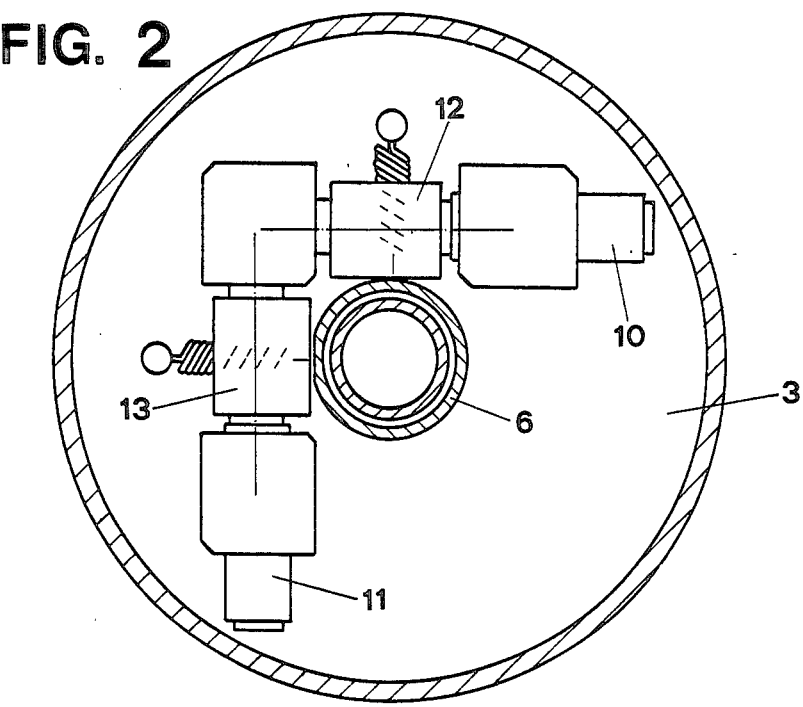
FIG. 2 is a section taken on the line I—I in FIG. 1 in the direction of the arrows.
Figure 3:
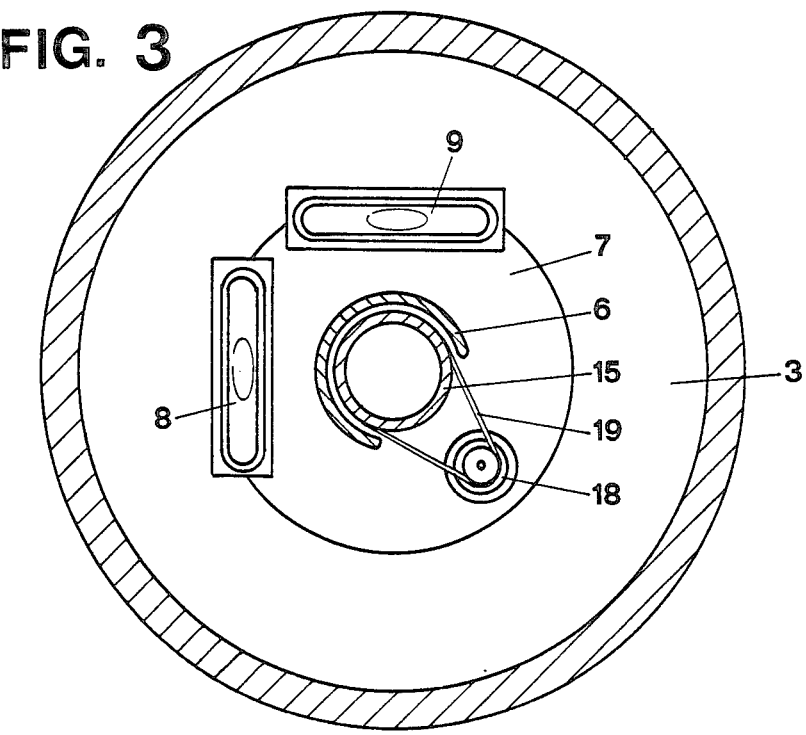
FIG. 3 is a section taken on the line II—II in FIG. 1 in the direction of the arrows.

Referring to the drawings, the essential functional components of the laser beam levelling instrument according to the invention are housed in a cylindrical casing 1 which comprises a lower casing part 2 and an upper casing part 3. Electric batteries (not shown) which serve as a power supply for the instrument are located in the lower casing part 2. The upper casing part 3 is provided with a cover 4 having a centrally positioned hole 5 through which passes vertically a pipe length 6. The pipe length 6 is mounted in the hole 5 in such a way that its ends are pivotable at least in crosswise manner and for this purpose the mounting bearing can take the form of a spherical joint bearing. A light source producing laser light is housed in the lower part of the pipe length 6 and a plate 7 is mounted on the lower end of the pipe length 6 such that its surfaces are horizontal. Two spirit levels 8 and 9 are mounted at right angles to one another on the plate 7 and are filled with a liquid which conducts electric current. Each spirit level 8, 9 contains four electric contact points for operating two circuits. The current of the two circuits of each spirit level enables electric motors 10 and 11 to run backwards or forwards for each spirit level. The two electric motors 10 and 11 are secured to the underside of the cover 4 of the upper casing part 3. Each electric motor 10, 11 has, respectively, an eccentric shaft 12 or 13, said shafts coming into contact with the circumferential surface of the pipe length 6.

The pipe length 6 should always be precisely vertical. If it diverges from the vertical, then the electric current via the two spirit levels 8 and 9 and electric motors 10 and 11 ensures that the pipe length 6 is returned to the vertical position. Against the tension of springs 14, the eccentric shafts 12 and 13 can exert a force against the circumferential surface of pipe length 6 or if necessary reduce the force.

A further pipe length 15 is mounted in rotary manner in the upper end of the pipe length 6 and carries at its free end a head 16 with an aperture 17. A pentaprism for deflecting a laser beam arriving vertically from the light source at the lower part of the pipe length 6 into a horizontal beam is provided in the head 16 and the aperture 17 serves as a window for allowing the horizontal beam to pass out of the head 16.

The further pipe length 15, together with the head 16 can be constantly revolved by means of a third electric motor 18 via an endless driving band 19. A receiver (not shown) renders visible the laser beam passing invisibly and horizontally thru the window 17.

Means other than spirit levels can be used for monitoring the vertical position of the pipe length 6, such as e.g. two pendulums swinging backwards and forwards at right angles at the lower end of the pipe length 6 and which close at least one circuit on diverging from the vertical.

Other embodiments and modifications are envisaged without departing from the spirit and scope of the invention as defined by the appended claims.

I claim:

1. A laser beam levelling instrument having means for producing a vertical laser beam and rotary reflection means for deflecting said vertical laser beam into a horizontal beam, at least said beam deflecting means being mounted on a pipe length which is suspended vertically in a bearing about which it is pivotable in a horizontal plane, means being provided for maintaining said pipe length in a vertical position, said means being arranged to close at least one electric circuit when the pipe length diverges from the vertical position and by means of which at least one electric motor is operative to restore the pipe length to said vertical position, said at least one electric motor having means to enable it to be rotated backwards and forwards and having an eccentric shaft which comes into contact with the circumferential surface of the pipe length so that the latter is brought into the vertical position again as soon as there is a divergence from the vertical.

2. A laser beam levelling instrument as claimed in claim 1, in which said electric circuit closing means comprise two spirit levels located on said pipe length at right angles to one another, each said spirit level being filled with an electrically conducting fluid and being provided with electric contact points which close said at least one electric circuit when the pipe length diverges from said vertical position.

3. A laser beam levelling instrument as claimed in claim 1, in which said means producing the laser beam comprises a light source housed in the lower part of the pipe length.

4. A laser beam levelling instrument as claimed in claim 1 and further comprising a casing, said pipe length being located in said casing.

5. A laser beam levelling instrument as claimed in claim 4, in which the casing has a cover, a spherical joint bearing being provided in the said cover and said pipe length being mounted in said spherical joint bearing.

6. A laser beam levelling instrument as claimed in claim 5, in which said casing has a lower compartment adapted to receive and house electric batteries which serve as a power supply for said instrument.

7. A laser beam levelling instrument as claimed in claim 1, in which a further pipe length is inserted in the upper end of said pipe length and in which a head provided with an aperture is mounted on the upper end of said further pipe length, said beam deflecting means being mounted in the head and passing horizontally out of said head thru said aperture.

8. A laser beam levelling instrument as claimed in claim 7, in which a further electric motor is arranged to rotate said further pipe length, together with said head.

* * * * *